April 7, 1959     E. W. WYNN     2,880,961

VALVES OF THE DIAPHRAGM TYPE

Filed Aug. 14, 1953     5 Sheets-Sheet 1

INVENTOR
EDWARD WATKIN WYNN
BY
Marshall, Marshall & Yeasting
ATTORNEYS

April 7, 1959  E. W. WYNN  2,880,961
VALVES OF THE DIAPHRAGM TYPE
Filed Aug. 14, 1953  5 Sheets-Sheet 2

INVENTOR
EDWARD WATKIN WYNN
BY
Marshall, Marshall & Yeasting
ATTORNEYS

INVENTOR
EDWARD WATKIN WYNN

April 7, 1959     E. W. WYNN     2,880,961
VALVES OF THE DIAPHRAGM TYPE

Filed Aug. 14, 1953     5 Sheets-Sheet 4

INVENTOR
EDWARD WATKIN WYNN
BY
Marshall, Marshall & Yeasting
ATTORNEYS

April 7, 1959 E. W. WYNN 2,880,961
VALVES OF THE DIAPHRAGM TYPE
Filed Aug. 14, 1953 5 Sheets-Sheet 5

INVENTOR
EDWARD WATKIN WYNN

2,880,961

United States Patent Office

Patented Apr. 7, 1959

2,880,961
VALVES OF THE DIAPHRAGM TYPE

Edward Watkin Wynn, Bwlchgwyn, Wrexham, Wales

Application August 14, 1953, Serial No. 374,377

Claims priority, application Great Britain July 27, 1953

3 Claims. (Cl. 251—331)

This invention relates to valves of the diaphragm type and is an improvement in or modification of the diaphragm valve described, illustrated and claimed in my prior British patent specification No. 624,576.

According to the invention described, illustrated and claimed in my said prior British patent specification No. 624,576, a valve of the diaphragm type is characterised in that the seating surface for the diaphragm is constituted as part of a straight through passage leading from the inlet opening to the outlet opening and in that the plane containing the holding surface for the diaphragm is located adjacent to or coincident with the parallel plane containing a line joining the centres of the inlet and outlet openings of the valve, said valve incorporating in combination a body section having inlet and outlet openings, a straight through interrupted passage leading from the inlet opening to the outlet opening and an opening of elliptical shape arranged with the major axis at right angles to the line of flow of the fluid to be controlled by the valve, a holding surface bounding said elliptical opening, an ellipsoidal diaphragm of flexible and resilient material having a marginal surface adapted to bed on the holding surface aforesaid and a central portion adapted to depend through said opening an actuating member of ellipsoidal formation adapted to be seated within the ellipsoidal portion of the diaghragm and which is connected to the diaphragm by forming the said diaphragm with an upstanding boss adapted to be wedged within a hole formed in the centre of the actuating member aforesaid, and means for effecting a movement of the said actuating member whereby the ellipsoidal portion of the diaphragm can be moved into sealing contact with the inner wall of the straight through passage for closing purposes and withdrawn out of sealing contact with the said wall for opening purposes.

The objects of the improvements or modifications constituting the present invention are to increase the sealing efficiency of diaphragm valves according to the parent patent and to enhance the longevity of the diaphragm itself.

Accordingly the invention consists of a diaphragm valve incorporating in combination a body section, a housing fitting on said body section, a diaphragm, an actuating member, and means to effect the movement of the actuating member to move the diaphragm into sealing contact with the body section. The body section has inlet and outlet openings, a straight through uninterrupted passage leading from the inlet opening to the outlet opening, an opening of elliptical shape arranged with the major axis at right angles to the direction of flow through the body section of the fluid to be controlled by the valve, and a holding surface bounding said elliptical opening. The housing is adapted to fit on the body section above the opening. The diaphragm is of flexible and resilient material and is provided with a marginal surface adapted to bed on the holding surface and to be clamped between the body section and the housing. A central portion of the diaphragm depends from the perimeter of the elliptical opening and extends with straight, flat, converging sides from the ends of the major axis of the ellipse to a lower central portion which is generally elliptical and of smaller area than the opening. The portions of the diaphragm between the upper and lower ellipses and separated by the straight, flat, converging side portions have configurations which approximate ellipsoidal polygons. The actuating member generally conforms to the upper surface of the dependent portion of the diaphragm and is of generally elliptical form in a plane parallel to the plane of the holding surface on the body, that elliptical portion also having its major axis at right anges to the direction of flow. Connection of the diaphragm to the actuating member is effected by means of an upstanding central boss on the diaphragm adapted to be engaged within a hole formed in the center of the actuating member. The means for moving the actuating member moves a portion of the dependent center region into sealing contact with the inner wall of the straight through passage for closing purposes, and withdraws that diaphragm out of sealing contact with the wall for opening purposes. The sealing action is achieved between seating surfaces for the diaphragm on the body section which are planar in the direction of flow and are of a straight converging form at the sides between the holding surface and a flat central portion and straight, flat, converging side portions on the actuating member which project from the underside thereof symmetrically about the central plane containing the major axis of the actuating member, whereby on closing the valve the said projecting means forces the diaphragm into sealing contact with the planar seating surfaces of the body section and so ensures efficient sealing without undue distortion of the diaphragm.

The invention also resides in the improved manner of connecting the diaphragm to the actuating member.

The invention still further resides in diaphragm valves, constructed, arranged and adapted for use substantially as described hereinafter.

The invention will now be described with particular reference to the accompanying drawings wherein.

In the drawings, where desirable like numerals of reference indicate similar parts in the several views.

Figure 1:
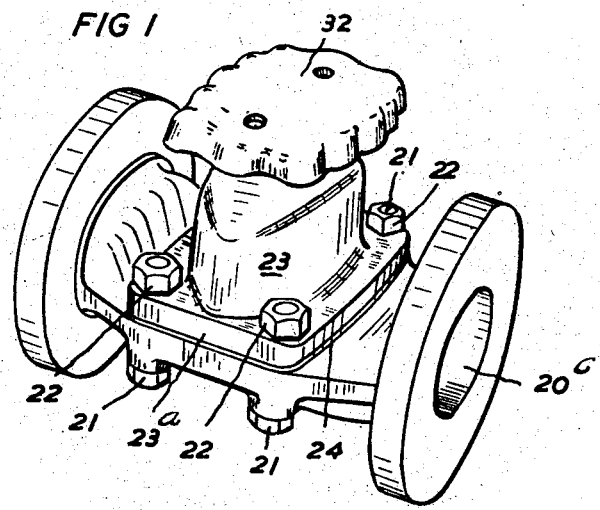
Figure 1 is a perspective view of a complete diaphragm valve constructed in accordance with the invention.

As illustrated in the drawings, the improved diaphragm valve incorporates a body casting 20 having therein a straight through passage 20a which terminates at each end in flanged inlet and outlet openings 20b, 20c respectively of circular formation.

Figure 2:
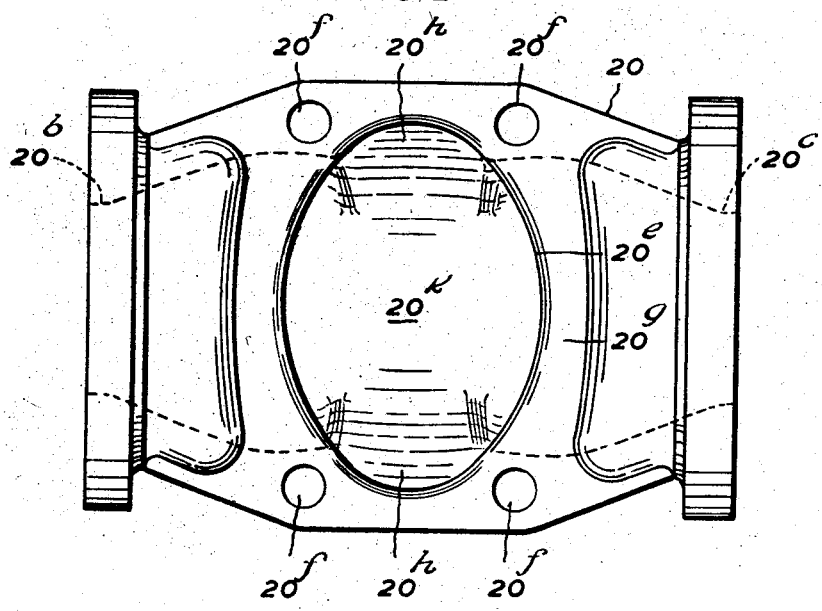
Figure 2 is a plan on an enlarged scale of the body casting of the diaphragm valve illustrated in Fig. 1.

The centre portion of the top of the body section 20, see Figure 2, is provided with an opening 20e of substantial elliptical shape with the major axis at right angles to the line of flow from the inlet to the outlet openings 20b, 20c. Projecting outwardly from the central portion of the body casting 20 adjacent to the ends of the aforesaid central opening 20e therein are flanges having therein holes 20f through which are passed bolts 21 which in conjunction with nuts 22 serve to secure to the body casting 20 a domed housing 23, the hollow interior of which is of elliptical shape in transverse cross section. This domed housing 23 is provided at its lower end with a flange 23a having straight front and rear ends and outwardly curved sides which is complementary to a seating face 20g formed on the body casting 20 surrounding the central opening 20e therein, said face 20g being termed hereinafter the holding surface 20g.

Adapted to be clamped between the flange 23a on the domed housing 23 and the aforesaid holding surface 20g is the marginal portion of the diaphragm 24 preferably made from synthetic rubber or other flexible and resilient material depending upon the nature of the liquid to be dealt with, said diaphragm being provided with a marginal portion 24a having an inner periphery of generally elliptical form and a centrally disposed depressed operative portion 24b of a hollow shape. The form of the hollow or dependent portion of diaphragm 24 is such as to conform with the actuating member 26 and the seat 20h to effect a seal therebetween and therefore includes a flat bottom portion 24h which is essentially elliptical and sides which join the upper and lower elliptical portions along straight-flat surfaces 24g at the ends of the parallel major axes of those ellipses and in region between those surfaces and the ellipses by generally ellipsoidal polygons. Adjacent to each corner the diaphragm 24 is provided with holes 24c through which, after assembly, are passed the bolts 21 aforesaid. The marginal portion 24a is provided with straight ends 24d, outwardly bulging curved sides 24e and, on one end, a tab 24f on which may be impressed the identification characteristics of the particular diaphragm in use.

When viewed in side elevation the diaphragm is provided with outwardly depending relatively straight sections 24g which merge into a relatively flattened bottom section 24h.

The inner surface of the central portion of the body casting 20 is provided with seating surfaces for the diaphragm 24 which are planar in the direction of flow and which are complementary in shape to the shape of the depending portion 24b of the diaphragm 24 when viewed looking through the passage, namely the said seating surfaces incorporate converging planar sections 20h which merge at the lower ends into a transverse planar section 20k.

Figure 5:
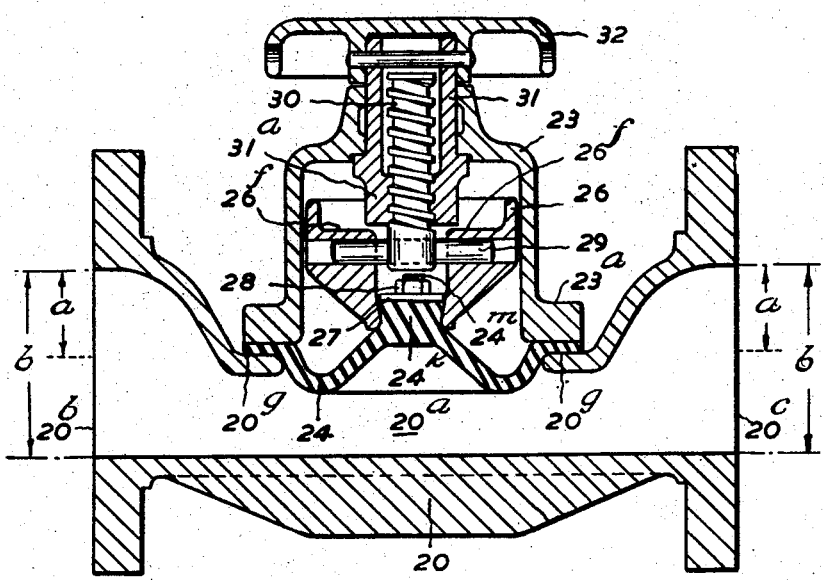
Figure 5 is a longitudinal vertical section of the diaphragm valve illustrated in Figures 1, 3 and 4 showing the diaphragm in the open position.
Figure 6:
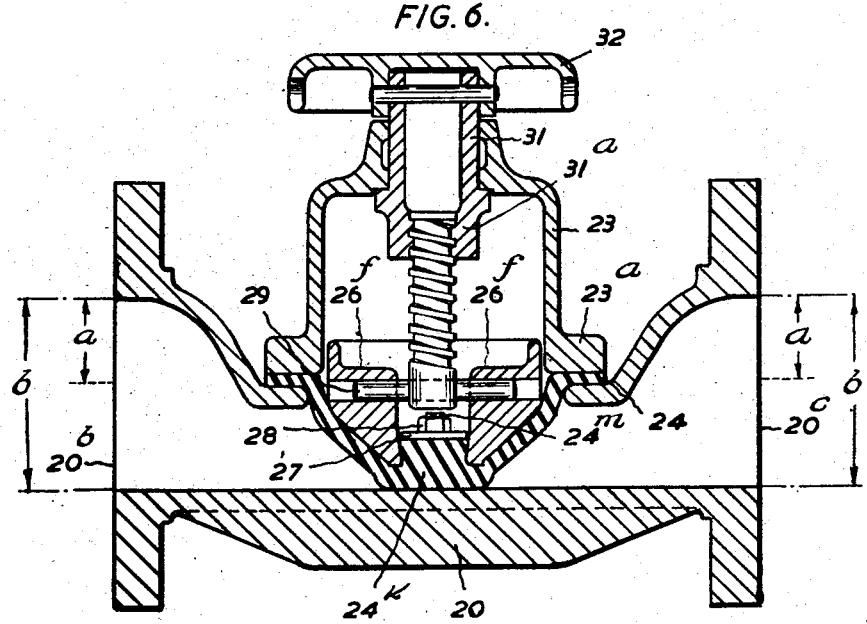
Figure 6 is a similar view of Figure 5 but showing the diaphragm in the closing position.
Figure 7:
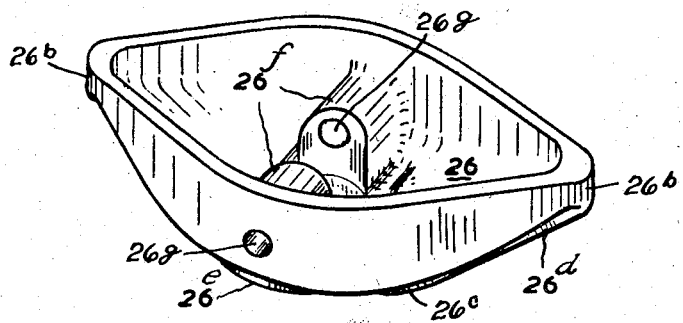
Figure 7 is a perspective view of the actuating member used for effecting in Figures 1 and 3 to 6 the operation of the diaphragm of the valve illustrated.
Figure 8:
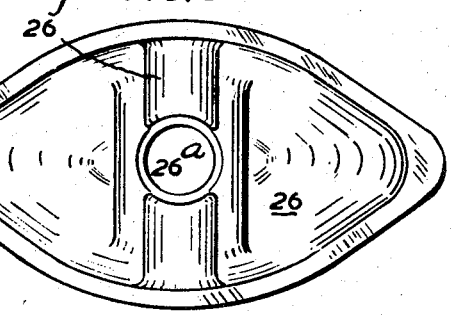
Figure 8 is a plan of the actuating member illustrated in Figure 7.

As in the case of the hereinbefore mentioned British Patent No. 624,576, the plane of the holding surface 20g is located in a plane which is adjacent to or even coincident with the parallel median plane containing the line joining the centres of the inlet and outlet openings 20b, 20c. By the expression "adjacent" as just recited is meant a plane for the holding surface 20g which is located below a plane containing the uppermost point of an inlet or outlet opening 20b, 20c, at a distance not less than ⅔ of the diameter of the inlet or outlet opening 20b, 20c, or of the depth of such openings where these are non-circular. That is to say that the distance a as indicated in Figures 5 and 6 must not be less than ⅔ of the distance b as indicated in the said figures.

As an example, in the case of a valve having inlet and outlet openings of 5" in diameter, the plane of the holding surface 20g must be not less than 2" below the highest points of the said inlet and outlet openings 20b, 20c.

The actual upper limit is determined by the nature of the material from which the diaphragm 24 is made, whilst the lower limit of the plane of the holding surface 20g is dependent, of course, upon the flow capacity of the valve or velocity of fluid therethrough.

The center or dependent portion 24b of the diaphragm 24 is provided at the centre with an upstanding boss 24k which is adapted to be engaged within a frusto-conical hole 26a formed in the centre of a metallic actuating member 26 of a hollow shape conforming generally to the dependent portion 24b of the diaphragm.

The said upstanding boss 24k has moulded therein and bonded thereto an upstanding screw 24m which co-operates with a washer 27 and nut 28 so that after the upstanding boss 24k has been forced into the hole 26a the tightening of the nut 28 through the washer 27 distorts the material of the boss 24k into firm holding contact with the wall of the hole 26a in the actuating member 26 within which the said boss 24k is located.

The actuating member 26 is provided at the ends with portions 26b which are slidably mounted within end portions of the domed housing 23 aforesaid so that the actuating member 26 is slidable axially but is non-rotatable relatively to said housing 23.

Figure 9:
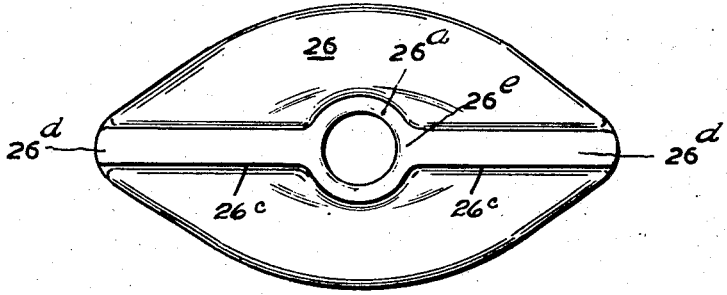
Figure 9 is a plan of the underside of the actuating member illustrated in Figures 7 and 8.
Figure 10:
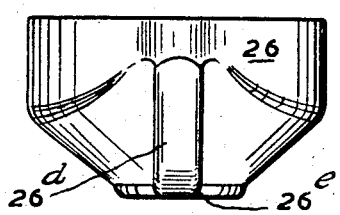
Figure 10 is an end view of the actuating member illustrated in Figures 7-9.
Figure 11:
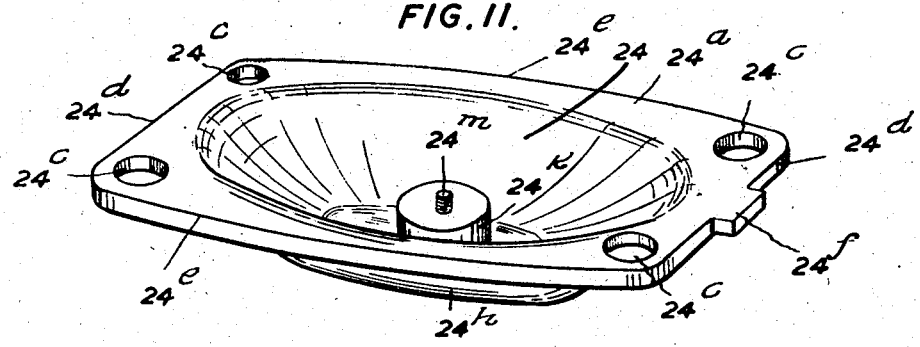
Figure 11 is a perspective view on an enlarged scale of the diaphragm employed in the valve illustrated in Figures 1, 3, 4, 5 and 6.
Figure 12:
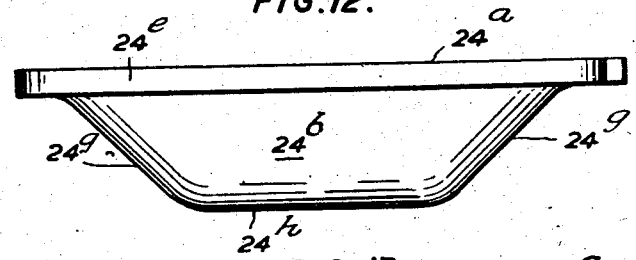
Figure 12 is a side elevation of the diaphragm illustrated in Figure 11.
Figure 13:
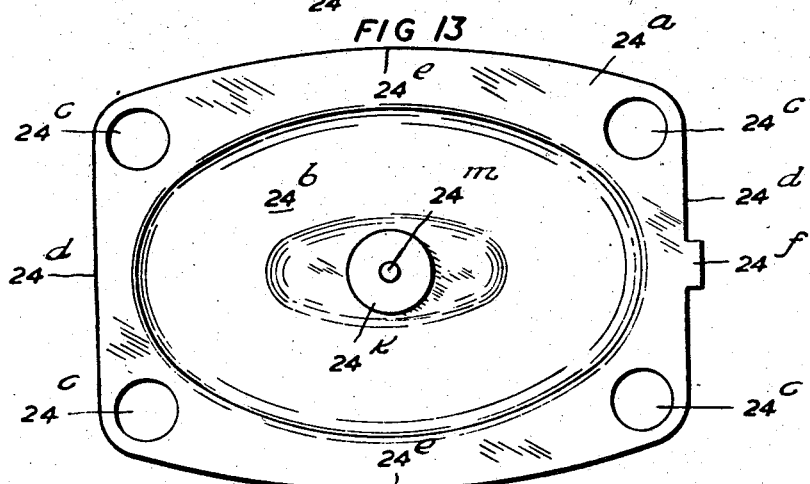
Figure 13 is a plan of the diaphragm illustrated in Figures 11 and 12.
Figure 14:
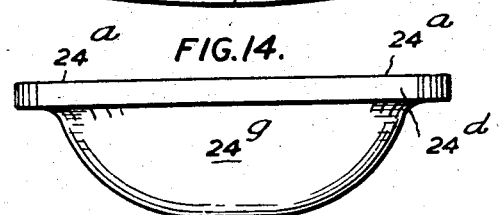
Figure 14 is an end elevation of the diaphragm illustrated in Figures 11–13.

As is clearly seen in Figures 9 and 10, the actuating member 26 is provided on the underside with a depending projecting rib 26c.

The said rib 26c, when viewed in side elevation, has a configuration corresponding to the configuration of the straight-flat surfaces 24g of diaphragm 24, namely converging sides 26d which merge into a transverse bottom section 26e.

The actuating member 26 is provided with internal lugs 26f having therein holes 26g through which is passed a transverse pin 29 which serves to connect pivotally to the actuating member 26 the lower end of an actuating screw 30.

The actuating screw 30 is adapted to co-operate with the internally tapped portion 31a of a sleeve 31 which is rotatably mounted in the top of the domed housing 23, but which is not axially displaceable relatively thereto so that the tapped portion 31a is able to act as a rotatable but non-axially displaceable nut.

The upper end of the sleeve 31 projects from the housing 23 and has pinned thereto an operating head 32 of substantially elliptical shape which is fluted around the ends and sides for facilitating gripping and manipulation.

It will be appreciated that when the operating head 32 is turned for effecting closing of the valve, the rotation of the sleeve 31 through the tapped portion 31a which acts as a nut, causes the screw 30 to effect a downwards movement of the actuating member 26, which in turn exerts a downwards pressure on the presented surface of the dependent portion 24b of the diaphragm 24 and ultimately presses the said elliptical, flat bottom portion 24h into sealing contact with the planar surface 20k of the body casting 20 and the straight, flat side portions 24g of the diaphragm with the straight, flat side portions 20h of the body along a defined strip determined by the width of the undersurface of the rib 26c without subjecting the center or dependent portion 24b to undue distorting stresses which might reduce the life of the diaphragm.

When the valve is closed to obtain an effective seal under high pressure it is necessary to compress the diaphragm between the seat and actuator over its entire sealing face. Advantageously this compression across the sealing face, normal to the valve seat, should be uniform at all points so that no point is subjected to a greater compression than any other and there is no concentration of distortion in the diaphragm at any point. The converging planar sections 20h of the seating surfaces which merge at the lower ends into a transverse planar section 20k and the complementary portions of the diaphragm 24 and the actuator 26 enable a uniform pressure to be imposed on the diaphragm normal to the seating surfaces.

Figure 3:
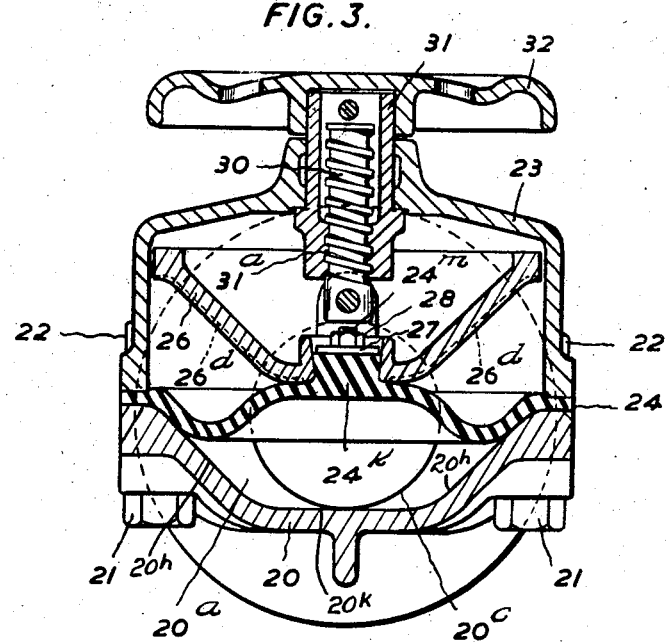
Figure 3 is a transverse vertical section of the valve illustrated in Figure 1 showing the diaphragm in the open position.
Figure 4:
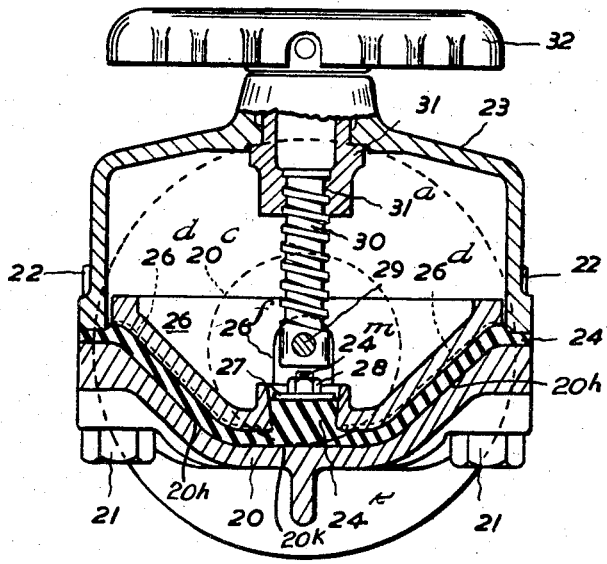
Figure 4 is a similar view to Figure 3 showing the diaphragm in the closing position and with parts of the operating head shown in elevation.

While any degree of convergence of the planar sections 20h as shown in Figures 2, 3 and 4 can be utilized to accomplish this result, consider the exemplary construction of the drawings wherein they converge at essentially 90° and each merge with the bottom portion 20k at essentially 45°. In this construction the sides 26d approach the complementary converging planar seating portions 20h as the actuator is advanced along the axis of its driving screw 30 a distance which is the product of the axial advancement and the sine of one half the angle of convergence of the sides, 45° in the example. Accordingly, as the actuator is advanced toward its closed position, the sides approach each other at a lesser rate than the bottom portions normal to the axis of driving screw 30 and in a fixed relationship to that motion so that by simple calculation knowing the desired degree of compression for the fully closed position one can ascertain the relationship of the sides 20h and bottom 20k to the actuator rib sides 26d and bottom 26e for whatever angle is chosen.

Generally, the inclined sides 26d will be arranged to initiate compression of the diaphragm against the planar seat portions 20h before compression of the diaphragm is initiated between bottom 26e and planar bottom 20k. Once compression is initiated in the bottom region it progresses at a more rapid rate for a given axial advancement of the actuator. Advancement of the actuator can be terminated when the compression in the bottom and side portions of the diaphragm are uniform In the valve illustrated the compressed thickness of the diaphragm is uniform over the side and bottom portions when the valve is fully closed as shown in Figure 4. This is realized by relating the seat, actuator and diaphragm so as to compress the side portions before compression is initiated in the bottom portions by an amount determined by the difference between the total compression and the product of the total compression and the sine of one half the angle of convergence of the sides.

The use of the flat converging sides thereby enables the valve designer to precisely design a valve offering uniform sealing pressure on the diaphragm and thus a long diaphragm life and a more reliable sealing by means of the above elementary calculations.

Furthermore it is to be appreciated that by forming the marginal flange 24a of the diaphragm 24 with outwardly curving sides 24e the diaphragm can be moulded so as to provide efficient reinforcement at the parts symmetrical with the minor axis and which are subject to the greater stresses during closing of the valve.

In addition it is found that by passing the bolts 21 through holes 24c in the marginal flange 24a of the diaphragm 24 that the said diaphragm 24 is securely anchored at the corners as well as being subject to compression between the domed casing 23 and the seating surface 20g.

Moreover, it will be appreciated that the invention is equally applicable to diaphragm valves with a body section having tapped inlet and outlet openings for screw connection with pipe lines.

I claim:
1. A valve of the diaphragm type for the control of fluids having a straight through bore adapted to be closed by a flexible diaphragm of which the margin is clamped against a holding surface on the valve body and which is movable in a direction at right angles to the axis of the bore and adapted when closed to engage a seating in the bore, characterized in that the diaphragm is engaged along an elliptical margin at said holding surface and has a dependent portion extending from said margin which is of elongated cross section parallel to the plane of said margin, said dependent portion having the major axes of the ellipse and of the elongated portions at right angles to the axis of the valve bore, the seating with which the diaphragm engages is formed in a transversely enlarged portion of the bore and in transverse section has a flat central portion in the same plane as the bottom of the bore and oppositely inclined straight portions merging with the flat central portion, an actuator having a surface which is complementary with said seating, the seating and actuator having the complementary portions of their respective bottoms and sides each intersect at an angle which is so correlated to the distance between the complementary bottoms when the complementary side surfaces just contact the side surfaces of the diaphragm that compression of the diaphragm between the side surfaces of the actuator and the side surfaces of the bore to a predetermined perpendicular distance will effect compression of the diaphragm between the bottom surface of the bore and actuator to an equal perpendicular distance, and means to advance and retract said actuator toward and from said seating.

2. A diaphragm valve as claimed in claim 1 in which the transverse width of the through bore in the valve body increases progressively from the ends which are of circular cross-section to the center where the seating for the diaphragm is located.

3. A diaphragm valve as claimed in claim 1 in which the actuator has on its underside a projecting rib of which the surface is complementary to that of the seating in the valve body and is adapted to urge the diaphragm into close sealing engagement with the seating when the valve is closed.

References Cited in the file of this patent

UNITED STATES PATENTS

| 307,871 | Richtman | Nov. 11, 1884 |
| 1,992,043 | Saunders | Feb. 19, 1935 |
| 2,302,930 | Anderson | Nov. 24, 1942 |

FOREIGN PATENTS

| 434,664 | Great Britain | of 1935 |
| 624,576 | Great Britain | June 13, 1949 |